(12) United States Patent
Gupta et al.

(10) Patent No.: US 10,817,276 B2
(45) Date of Patent: Oct. 27, 2020

(54) METHODS, SYSTEMS, AND COMPUTER READABLE MEDIA FOR MACHINE TYPE COMMUNICATION (MTC)/INTERNET OF THINGS (IOT) DEVICE SOFTWARE UPDATING

(71) Applicant: Oracle International Corporation, Redwood Shores, CA (US)

(72) Inventors: Nitin Gupta, Bangalore (IN); Venkatesh Aravamudhan, Bangalore (IN); Raghuvamshi vasudev Singh Thakur, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 64 days.

(21) Appl. No.: 16/143,365

(22) Filed: Sep. 26, 2018

(65) Prior Publication Data
US 2020/0097277 A1 Mar. 26, 2020

(51) Int. Cl.
*G06F 9/44* (2018.01)
*G06F 8/65* (2018.01)
(Continued)

(52) U.S. Cl.
CPC .................. *G06F 8/65* (2013.01); *G06F 8/61* (2013.01); *H04L 67/34* (2013.01); *H04L 67/12* (2013.01)

(58) Field of Classification Search
CPC ....................................................... G06F 8/65
(Continued)

(56) References Cited

U.S. PATENT DOCUMENTS 8,146,075 B2 * 3/2012 Mahajan .................. G06F 8/43
717/170
8,494,527 B2 * 7/2013 Noldus ................... H04M 3/58
370/331
(Continued)

OTHER PUBLICATIONS

"3rd Generation Partnership Project; Technical Specification Group Services and System Aspects, Architecture enhancements to facilitate communications with packet data networks and applications (Release 16)," 3GPP TS 23.682 v16.0.0, pp. 1-126 (Sep. 2018).
(Continued)

*Primary Examiner* — Evral E Bodden
(74) *Attorney, Agent, or Firm* — Jenkins, Wilson & Taylor & Hunt, P.A.

(57) ABSTRACT

Methods, systems, and computer readable media for machine type communications/Internet of things (MTC/IoT) device updating are described. One method for machine type communications (MTC) device software updating includes receiving, by a control plane network node including at least one processor and via non-Internet protocol data delivery (NIDD) or non-access stratum (NAS) messaging, hardware and software version information regarding an MTC device. The method includes identifying, by the control plane network node, that a software update is available for the MTC device. The method further includes, in response determining that a software update is available for the MTC device, transmitting, by the control plane network node and via NIDD or NAS messaging, the software update to the MTC device. The method further includes receiving, at the control plane network node and via NIDD or NAS messaging, status information regarding delivery of the software update to the MTC device or installation of the software update by the MTC device.

18 Claims, 9 Drawing Sheets

(51) Int. Cl.
*G06F 8/61* (2018.01)
*H04L 29/08* (2006.01)

(58) Field of Classification Search
USPC .......................................................... 717/169
See application file for complete search history.

(56) References Cited

U.S. PATENT DOCUMENTS

| 9,191,461 | B2* | 11/2015 | Jogadhenu | H04L 67/34 |
| 2001/0046854 | A1* | 11/2001 | Henry | H04W 8/245 |
| | | | | 455/419 |
| 2018/0295556 | A1* | 10/2018 | Baek | H04W 8/20 |

OTHER PUBLICATIONS

"3rd Generation Partnership Project; Technical Specification Group and System Aspects; General Packet Radio Service (GPRS) enhancements for Evolved Universal Terrestrial Radio Access Network (E-UTRAN) access (Release 15)," 3GPP TS 23.401 v15.4.0, pp. 1-411 (Jun. 2018).

"3rd Generation Partnership Project; Technical Specification Group Core Network and Terminals; T8 reference point for Northbound APIs; (Release 15)," 3GPP TS 29.122 v15.0.0, pp. 1-255 (Jun. 2018).

"3rd Generation Partnership Project; Technical Specification Group Core Network and Terminals; Mobility Management Entity (MME) and Serving GPRS Support Node (SGSN) interfaces for interworking with packet data networks and applications (Release 15)," 3GPP TS 29.128 v15.3.0, pp. 1-51 (Jun. 2018).

* cited by examiner

METHODS, SYSTEMS, AND COMPUTER READABLE MEDIA FOR MACHINE TYPE COMMUNICATION (MTC)/INTERNET OF THINGS (IOT) DEVICE SOFTWARE UPDATING

TECHNICAL FIELD

The subject matter described herein relates to MTC or IoT devices. More particularly, the subject matter described herein relates to methods, systems, and computer readable media for MTC/IoT device software updating

BACKGROUND

MTC or IoT devices (hereinafter, "MTC devices"), such as sensors, play a large role in data traffic growth in today's communication networks. MTC devices communicate with other network nodes using non-Internet protocol (non-IP) data communications. For example, a sensor may wake up and send its data to an application server (AS) using non-IP data communications.

One advantage of communicating with other network nodes using non-IP communications is that the MTC device is not required to implement an IP protocol stack or maintain IP connectivity with other nodes. Not maintaining a full IP protocol stack can save battery life and simplify the architecture of MTC devices.

Sometimes it is necessary to update software on an MTC device. Current Third Generation Partnership Project (3GPP) specifications do not clearly define a procedure for performing a software update for an MTC device. One possible mechanism for performing software upgrades on an MTC device is to use the background file transfer mechanism. The background file transfer mechanism uses IP connectivity. Using IP connectivity to implement MTC device software updates fails to take advantage of the benefits of non-IP data usage and inherent battery savings that can be achieved through the use of the control plane path to deliver data to an MTC device. Thus, using a background file transfer procedure for updating software on an MTC device is undesirable.

Accordingly, there exists a need for improved methods, systems, and computer readable media for MTC/IoT device software updating that avoids at least some of the difficulties associated with conventional IoT device software updating.

SUMMARY

Methods, systems, and computer readable media for MTC/IoT device updating are described. One method for MTC device software updating includes receiving, by a control plane network node including at least one processor and via non-IP data delivery (NIDD) or non-access stratum (NAS) messaging, hardware and software version information regarding an MTC device. The method includes identifying, by the control plane network node, that a software update is available for the MTC device. The method further includes, in response determining that a software update is available for the MTC device, transmitting, by the control plane network node and via NIDD or NAS messaging, the software update to the MTC device. The method further includes receiving, at the control plane network node and via NIDD or NAS messaging, status information regarding delivery of the software update to the MTC device or installation of the software update by the MTC device.

In one implementation, the control plane network node that performs the MTC device software updating includes at least one of a mobility management entity (MME), a service capability exposure function (SCEF), a network gatekeeper, and an application server (AS).

In one exemplary implementation, receiving the hardware and software version information includes receiving the hardware and software version information at an AS and determining whether a software update is available for the MTC device includes performing a lookup in a software repository using the hardware version information.

In one exemplary implementation, receiving the hardware and software version information at the AS includes receiving the hardware and software version information from an SCEF via an NIDD submit request message.

In one exemplary implementation, transmitting the software update includes, transmitting, from an AS to an SCEF, the software update in an NIDD submit request message.

In one exemplary implementation, the software update is transmitted from the SCEF to a mobility management entity (MME) in a mobile terminated data transfer request message.

In one exemplary implementation, the software update is transmitted from the MME to the MTC device in a non-access stratum (NAS) message.

In one exemplary implementation, the NAS message comprises a NAS data transport message.

In one exemplary implementation, receiving status information regarding the software update comprises receiving, via NIDD messaging, an indication of delivery of the software update to the MTC device and installation of the software update by the MTC device.

The subject matter described herein also includes a system for MTC device software updating. The system includes a control plane network node that receives, via non-IP data delivery (NIDD) or non-access stratum (NAS) messaging, hardware and software version information regarding an MTC device. The system further includes a software update manager associated with the control plane network node for determining, based on the hardware and software version information, whether a software update is available for the MTC device, in response to identifying that a software update is available for the MTC device, transmitting the software update for delivery to the MTC device using NIDD or NAS messaging, and receiving, at the control plane network node and via NIDD or NAS messaging, status information delivery of the software update to the MTC device or installation of the software update by the MTC device.

In one exemplary implementation, the control plane network node comprises an AS configured to perform a lookup in a software repository to determine whether the software update is available for the MTC device.

In one exemplary implementation, the system includes an SCEF, and the AS receives the hardware and software version information from the SCEF via an NIDD submit request message.

In one exemplary implementation, the system comprises an SCEF and the control plane network node comprises an AS that transmits the software update to the SCEF in an NIDD submit request message.

In one exemplary implementation, the system comprises an MME configured to transmit the software update to the MME in a mobile terminated data transfer request message.

In one exemplary implementation, the MME is configured to transmit the software update from the MME to the MTC device in a non-access stratum (NAS) message.

In one exemplary implementation, the NAS message comprises a NAS data transport message.

In one exemplary implementation, the control plane network node is configured to receive, via NIDD messaging, an indication of delivery of the software update to the MTC device and installation of the software update by the MTC device.

In one exemplary implementation, the control plane network node is configured to deliver the software update to the MTC device in multiple parts.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

FIG. 2 is a block diagram illustrating software update need detection and software repository connectivity by an AS;

DETAILED DESCRIPTION

Figure 1:
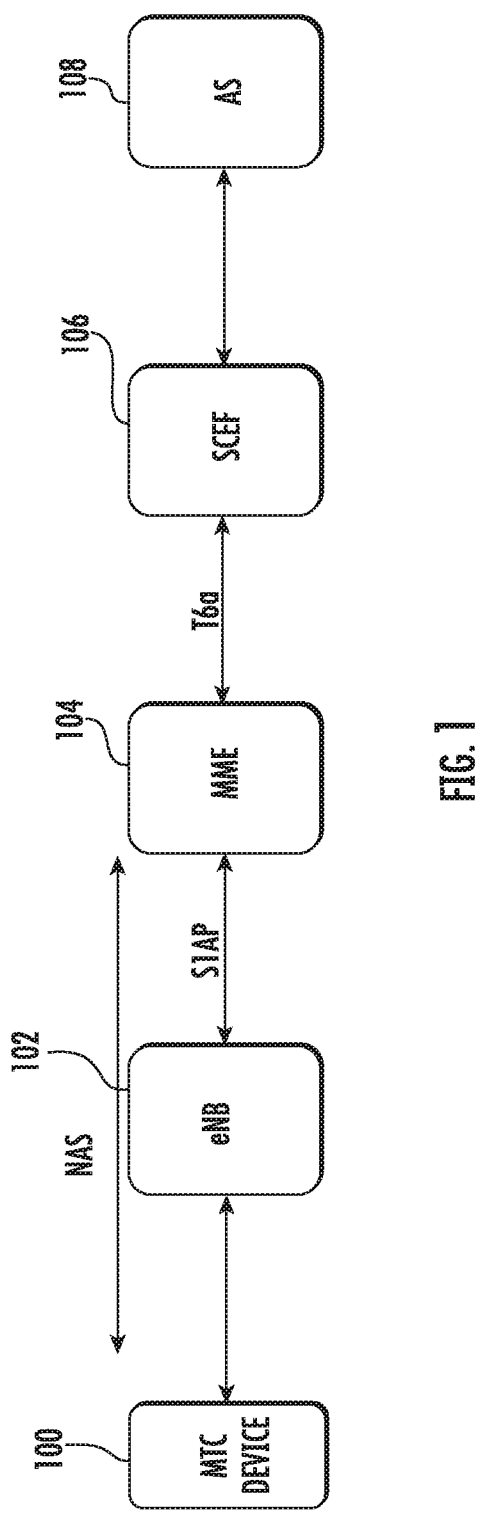
FIG. 1 is a network diagram illustrating an exemplary SCEF-based MTC network architecture.

Methods, systems, and computer readable media for MTC device software updating are disclosed. Rather than using an IP protocol stack and IP connectivity to deliver software to an MTC device, the subject matter described herein updates software of MTC devices using NIDD and NAS messaging and existing control plank network nodes. FIG. 1 is a network diagram illustrating an exemplary SCEF-based MTC network architecture in which MTC device software updating using NIDD and NAS messaging may be implemented. Referring to FIG. 1, the network includes an MTC device 100, and an evolved Node B (eNB) 102, an MME 104, an SCEF 106, and an AS 108. MTC device 100 may be any suitable device that uses machine type communications to communicate with the network and that is capable of communicating with the network using NIDD messaging. In general, NIDD messaging is messaging intended for short duration communications from an MTC device to the network. NIDD messaging does not involve an IP protocol stack, which conserves battery life on battery powered MTC devices and also simplifies the design of MTC devices. NIDD messaging is defined in the following 3GPP technical standards:

3GPP TS 23.401, General Packet Radio Service (GPRS) enhancements for Evolved Universal Terrestrial Radio Access Network (E-UTRAN) access, release 15, v15.4.0, June 2018;

3GPP TS 29.128 MME and SGSN interfaces for interworking with Packet Data Networks and Applications, release 15, v15.3.0, June 2018; and 3GPP TS 29.122, T8 reference point for northbound APIs, release 15, v15.0.0, June 2018.

The disclosures of each of the above-referenced 3GPP specifications are hereby incorporated herein by reference in their entireties. In 3GPP TS 23.401, section 5.5 defines the mobile originated data procedure. The mobile originated data procedure can be invoked by the MME or by a serving GPRS support node (SGSN) to forward mobile originated non-IP data of a mobile device to the SCEF. According to an aspect of the subject matter described herein, the mobile originated data procedure can be used to deliver hardware and software version information of MTC device 100 to SCEF 106. SCEF 106 and AS 108 will then use this information to determine whether a software update is needed for MTC device 100. Details on specific messages of the mobile originated data procedure that are used in delivering hardware and software version information to SCEF 106 will be described with respect to FIG. 3 below.

3GPP TS 23.401 also defines a mobile terminated data procedure. The mobile terminated data procedure, when invoked by SCEF 106 is used to forward mobile terminated IP data of a mobile user from the SCEF to the MME or the SGSN. The mobile terminated data procedure can be used according the subject matter described herein to deliver software updates from SCEF 106 to MME 104, which delivers the software updates to MTC device 100 using NAS messaging. Specific messages of the mobile terminated data procedure used to deliver the software updates will be described below with respect to FIG. 3.

Returning to the description of FIG. 1, eNB 102 is a network node that provides radio access to MTC devices. eNB 102 also perform signaling with core network nodes to facilitate communications with MTC device 100. MME 104 performs signaling functions associated with communications between MTC device 100 and the network. The signaling functions include authenticating MTC device 100 and registering MTC device 100 for communication with the network. In the illustrated example, MME 104 connects to eNB 102 via the S1AP interface and with SCEF 106 via the T6a interface. MME 104 signals MTC device 100 using NAS signaling. It is this NAS signaling that can be used to deliver software updates from MME 104 to MTC device 100. The NAS signaling used for the software update is transparent to eNB 102 because eNB 102 does not participate in NAS protocol exchanges.

MME 104 also performs radio resource management for MTC device 100. MME 104 communicates with a home subscriber server (HSS) (not shown in FIG. 1) and the radio access network to decide appropriate radio resource management strategies for MTC device 100. MME 104 also performs mobility management for MTC device 100.

SCEF 106 in general exposes services and capabilities provided by the 3GPP network. SCEF 106 may provide application programming interfaces (APIs) that allow MTC devices to access services provided by AS 108. Although a single MME 104 and a single AS 108 are illustrated in FIG. 1, it is understood that SCEF 106 may be connected to multiple MMEs 104 and multiple ASs 108. In addition, a service capability server (SCS) may be connected between SCEF 106 and AS 108. In general, SCEF 106 allows non-IP devices, such MTC devices that cannot implement an IP stack to access 3GPP services provided by AS 108. A typical MTC device that might require access to services via SCEF 106 is a sensor that sleeps, awakens, and transmits data to the network. To provide such services, SCEF 106 may include a cellular device connectivity (CDC) service module that determines the location and connectivity of non-IP devices using other network resources, such as an HSS or MME to avoid the need for the MTC device to have location determining capabilities, such GPS capabilities. An example of functionality that may be implemented by SCEF 106 is described in commonly-assigned, co-pending U.S. Patent Application Publication No. 2018/0248711, the disclosure of which is incorporated herein by reference in its entirety.

As will be described in more detail below, SCEF 106 may store hardware and software information regarding MTC device 100 and delivers this information to AS 108. SCEF 106 also delivers software updates to MTC device 100 via MME 104 and eNB 102.

AS 108 provides application level services for MTC devices. Application level services may include triggering an MTC device to provide data to the network. As will be described in detail below, AS 108 may identify the need for updating software of an MTC device and they initiate the transfer of files to MTC device 100 for the software update.

Figure 2:
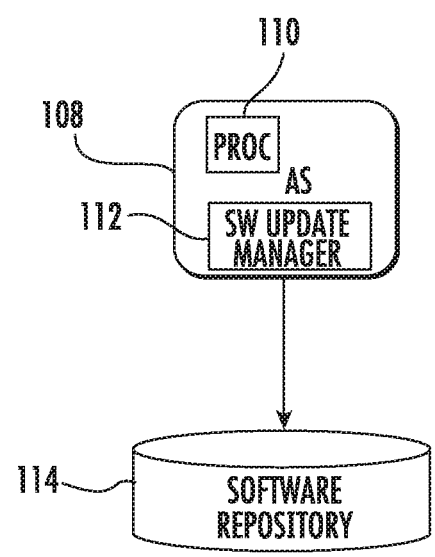

FIG. 2 is a block diagram illustrating in more detail functions performed by AS 108 in identifying the need for a software update and sending the software update to an MTC device. In FIG. 2, AS 108 includes at least one processor 110 and a software update manager 112. Software update manager 112 may be implemented in software executed by processor 110. Software update manager 112 may determine whether a software update is needed for MTC device 100 based on software version information of MTC device 100 received from SCEF 106 and also based on current software version information stored in a software repository 114. Software repository 114 may store current versions of software for MTC devices. Software repository 114 maybe a component of AS 110 or may reside on a node separate from AS 110. If software update manager 112 determines that a software update is needed, software update manager 112 may perform or initiate the software update procedure by sending the software update to MTC device 100 via one or more NIDD messages.

In general, software updating on an MTC device involves the following steps:
1. When and what to upgrade the MTC device?
   a. MTC devices may provide the hardware and software version information to the network utilizing the Attach-Accept procedure (to MME 104) and Connection Management Request procedure (to SCEF 106). SCEF 106 stores this information for a given MTC device, until mobile originated (MO) based NIDD communication occurs to send the hardware and software version information in an NIDD message to AS 108. This is an enhancement to the current behavior for both MTC device 100 and SCEF 106.
   b. AS 108 receives the hardware and software version information and determines if there is a new software version available for the given hardware type of MTC device 100. AS 108 may utilize an operator based policy to determine what target software version the device should be updated to.
2. Who triggers the software upgrade?
   In one exemplary implementation, AS 108 triggers the software update towards the MTC device using non-IP data delivery. AS 108 decides based on hardware/software information provided, a suitable software version to update the device with.
3. How to deliver the software update packages to the MTC device using existing network?
   a. AS 108 forwards the software embedded in messaging of a mobile terminated (MT) NIDD downlink procedure towards SCEF 106 (i.e., the MTC device software is transmitted as a payload in one or more downlink NIDD messages).
   b. SCEF 106 forwards the software received from AS 108 to MME 104. MME 104 subsequently packages this software as payload into one or more NAS packets and forwards the software to MTC device 100 (refer to FIG. 3 for details). To achieve reliable delivery of data between MTC device 100 and SCEF 106, the mechanism defined in section 4.5.14.2 of 3GPP TS 23.682, "Architecture enhancements to facilitate communications with packet data networks," Release 16 (September 2018), the disclosure of which is incorporated herein by reference in its entirety, may be followed. Section 4.5.14.2 describes enhancements for reliable non-IP data delivery. The enhancements include transmissions and acknowledgements on a hop by hop basis in both uplink and downlink directions. To ensure reliable non-IP data delivery (NIDD) between an MTC device and a SCEF using the control plane cellular IoT (CIoT) EPS optimization, the following functions may be implemented by MTC device 100, eNB 102, MME 104, and SCEF 106:
      Reliable delivery may be achieved using acknowledgements on a hop-by-hop basis, i.e., the link layer protocol on each interface used for NIDD uses acknowledgments and nodes apply retransmissions if needed to ensure reliable delivery.
      The MTC device may retransmit uplink (UL) data that was not acknowledged by the radio link controller (RLC) on the AS layer in the UE. For example, if MTC device 100 fails to receive acknowledgement of communication of the uplink data packet containing the hardware and software version information, MTC device 100 may retransmit the packet.
      The MME may retransmit downlink (DL) data for which the MME receives a non-delivery indication from the eNB (see e.g. TS 23.401 [7], clause 5.3.4B.3, step 15). For example, if MME 104 receives a non-delivery indication from eNB 102 for a packet containing a software update, MME 104 may retransmit the packet.
      The MME indicates to the SCEF the status of the DL data delivery. The SCEF may forward this status to the AS. For example, MME 104 may indicate to SCEF 106 the status of delivery to MTC device 100 of each packet containing a software update. For any packet that is not successfully received by MTC device 100, AS 108 may retransmit the packet.

Figure 3:
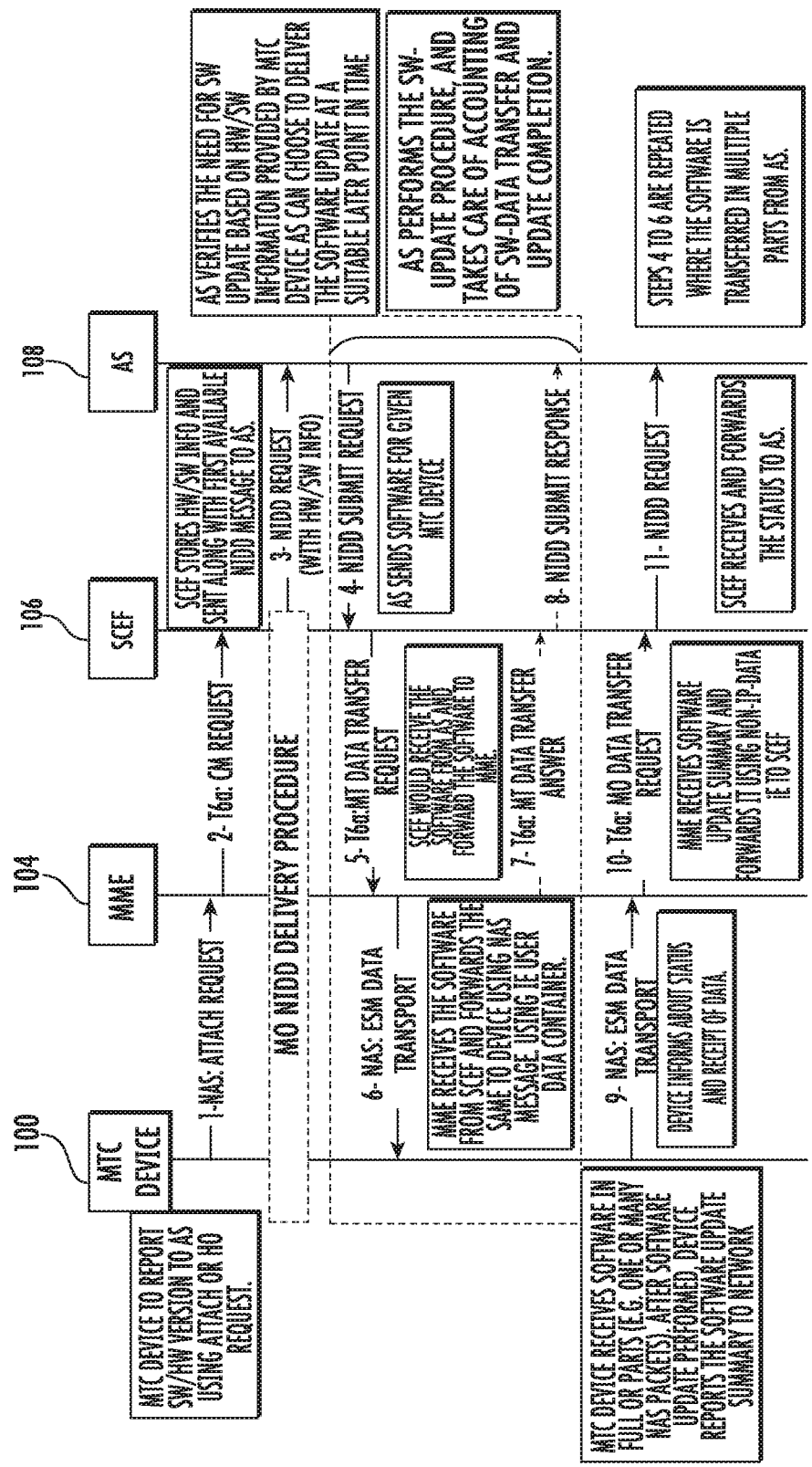
FIG. 3 is a message flow diagram illustrating exemplary steps for MTC device software updating using NIDD messaging.

FIG. 3 is a message flow diagram illustrating exemplary messaging between MTC device 100, MME 104, SCEF 106, and AS 108 in performing software updates of MTC device 100 referring to FIG. 3, in line 1 of the message flow diagram, MTC device 100 sends a NAS attach request message to MME 104. The NAS attach request message that carries an indication of the current hardware and software version used by MTC device 100. In an alternate implementation, the indication of the current hardware and software version used by MTC device 100 may be carried in a handover (HO) request message.

MME 104 receives the NAS attach request message and in line 2 sends a connection management (CM) request message to SCEF 106 over the T6a interface. The connection management request message carries the indication of the current hardware and software version used by MTC device 100. SCEF 106 receives the CM request message, stores the hardware and software version information, and communicates the hardware and software version information to AS 108 using the first available NIDD message (see NIDD request in line 3). In one example, the NIDD request is a MO data request message transmitted from the SCEF to the AS over the T8 interface.

AS 108 receives the NIDD request message including the hardware and software version information from MTC device 100 and determines whether there is a need for a software update based on the hardware and software version information provided by MTC device 100 and available software in software repository 114. To determine whether a software update is needed, AS 108 may perform a lookup in software repository 114 using the hardware version information provided by MTC device 100. If there is a match for the hardware version, AS 108 may determine whether there is a software version indicated by the database record for the hardware version of MTC device 100 that is more current than the software currently being used by MTC device 100. If the software version in repository 114 is more current than the software version currently being used by MTC device 100, AS 108 may determine that a software update is needed. If no software that is compatible with the current hardware version of MTC device 100 is located or if the current software version being used by MTC device 100 is up to date, AS 108 may determine that a software update is not needed. If AS 108 identifies a need for a software update, AS 108 may choose to deliver the software update to MTC device 100 immediately or at a later time, for example, during the time period when network activity is historically low.

In line 4 of the message flow diagram, AS 108 sends an NIDD submit request message to SCEF 106. The NIDD submit request message includes the software update for MTC device 100.

SCEF 106 receives the NIDD submit request message. In line 5, SCEF 106 initiates a mobile terminated data transfer request message and sends the message to MME 104 on the T6a interface. The mobile terminated data transfer request message includes the software update.

MME 104 receives the mobile terminated data transfer request message. In line 6, MME 104 formulates a NAS evolved packet system (EPS) session management (ESM) data transport message and sends the ESM data transport message to MTC device 100. EPS session management is a protocol that provides support for the in handling of user data in the NAS. As described herein, the ESM data transport message may be used to carry software from MME 104 to MTC device 100. The user data container informative element (IE) in the ESM data transport message may be used to carry the software.

In line 7 of the message flow diagram, MME 104 sends a mobile terminated data transfer answer message is in response to the MT data transfer request in line 6.

SCEF 106 receives the MT data transfer answer message from MME 104. In line 8 of the message flow diagram, SCEF 106 sends an NIDD submit response message to AS 108. The NIDD submit response message is a response to the NIDD submit request in line 4. It should be noted that lines 4-8 of the message flow diagram are associated with software updating of MTC device 100. AS 108 may perform accounting of the software data transfer and update completion after receiving the NIDD submit response in line 8. Steps 4-8 may be repeated multiple times when a software update is transmitted over multiple messages to MTC device 100.

After receiving the software update in line 6 (in one or many parts) MTC device 100 installs the software. After the software is installed, MTC device 100 reports the software update summary to the network. In line 9, MTC device 100 sends a NAS data transport message to MME 104. Then NAS data transport message indicates the status of the software update and acknowledges receipt of the software update.

MME 104 receives the NAS ESM data transport message. In line 10, MME 104 sends a mobile original data transfer request to SCEF 106. The mobile originated data transfer request includes a summary of the software update status. The software update status is communicated in the non-Internet protocol (non-IP) data information element to SCEF 106.

SCEF 106 receives the mobile original data transfer request that includes the software update status information. In line 11, SCEF 106 communicates the software update status to AS 108 via an NIDD request message. AS 108 updates the status information regarding the software update and stores the current version in software repository 114. Thus, using NIDD and NAS messaging, as illustrated in FIG. 3, software updating can be performed on an MTC device without implementing a full IP protocol stack on MTC device 100.

Figure 4:
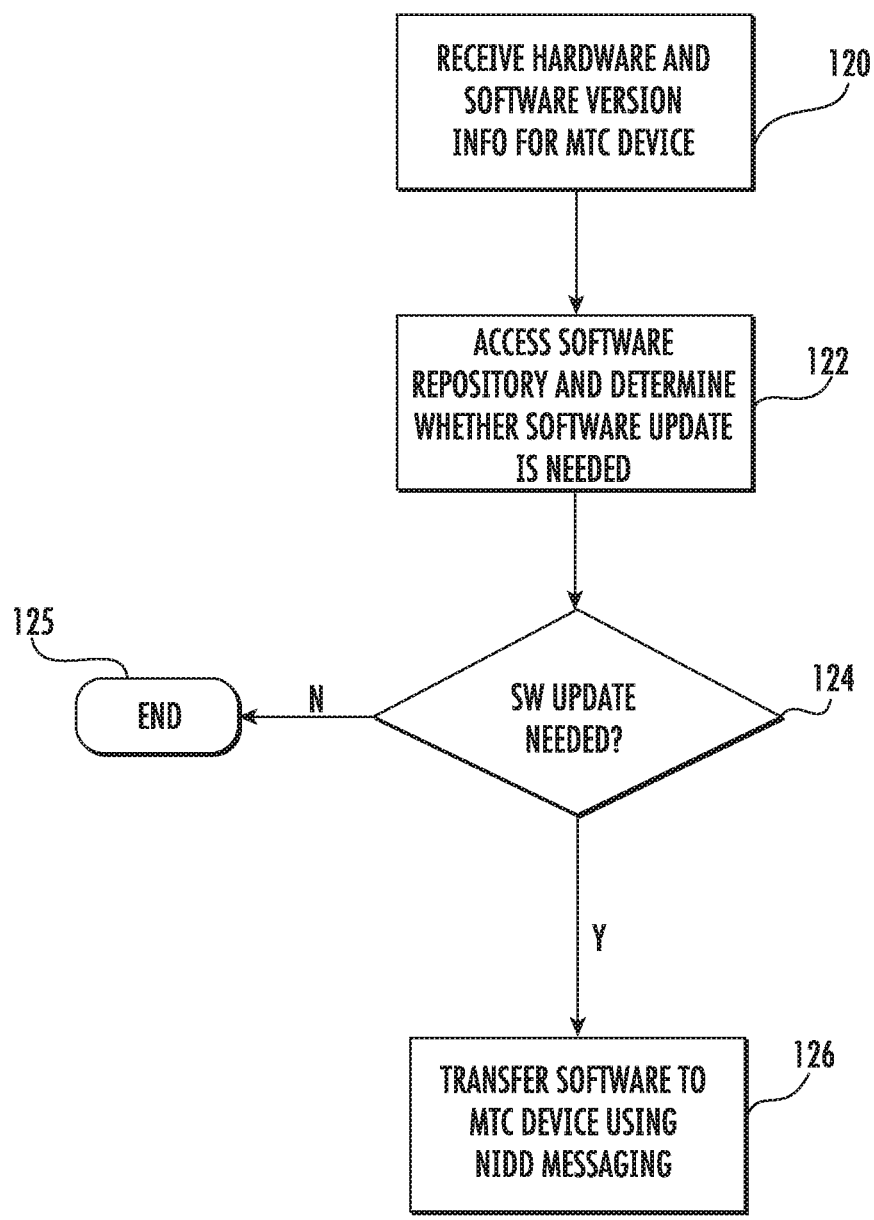
FIG. 4 is flow chart illustrating exemplary steps performed by an AS in performing MTC device software updating using NIDD and NAS messaging.

As stated above, AS 108, in one implementation may perform software update need determination and initiate the transfer of a software update to MTC device 100. FIG. 4 is a flow chart illustrating exemplary steps that may be performed by AS 108 to facilitate software updating of an MTC device using NIDD messaging. Referring to FIG. 4, in step 120, AS 108 receives hardware and software version information for an MTC device. As Illustrated in FIG. 3, the hardware and software information may be communicated to AS 108 by SCEF 106 using an NIDD request message.

In steps 122 and 124, AS 108 determines whether a software update is needed. Determining whether a software update is needed may include extracting the software and hardware version information received from MTC device 100 via MME 104 and SCEF 106 and accessing software repository 114 to determine whether a software update is available for the hardware of the given MTC device. These steps may be performed by software update manager 112 illustrated in FIG. 2.

If a software update is not needed, i.e., because the current version is up to date, control proceeds to step 125 where software update processing for the current MTC device ends. If it is determined that a software update is needed, control proceeds to step 126 where the software is transferred to the MTC device using NIDD messaging. The software update may traverse SCEF 106 and MME 104 (as well as eNB 102) before being delivered to the MTC device. Multiple NIDD and NAS messages may be required to deliver the software update to the MTC device.

It should be noted that in FIG. 4, a software update is triggered by the receipt of hardware and software configuration information for an MTC device. It should also be noted that a software update may be triggered when software is updated in software repository 118. In such a case, steps 124 and 126 may be triggered by the receipt of new software for an MTC device whose software and hardware version are maintained by AS 108. Thus, determining whether a software update is needed may include receiving hardware and software version information for an MTC device for which a more current version of software exists in repository 114 or receiving notification from repository 114 that new software is available for an MTC device whose hardware and software version are maintained by AS 108.

Figure 5:
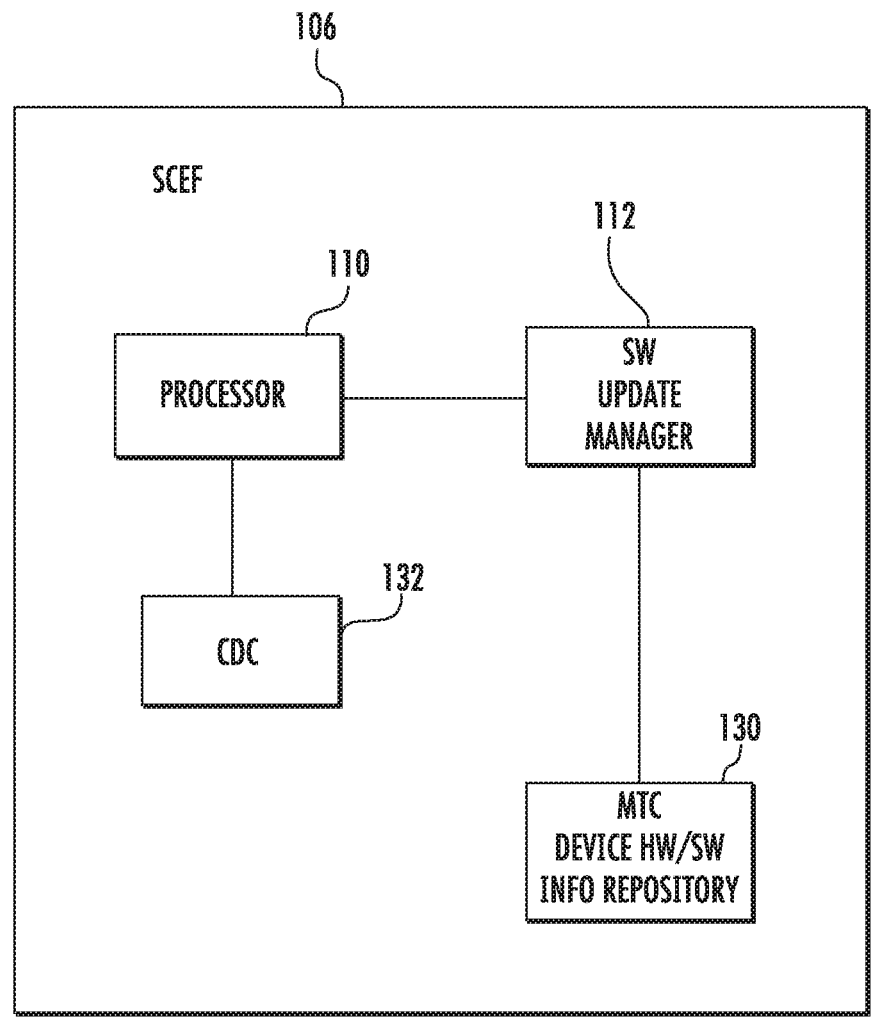
FIG. 5 is a block diagram of an SCEF for performing steps associated with MTC device software updating using NIDD messaging.

As illustrated in FIG. 3, SCEF 106 performs some of the functions associated with updating MTC device software. FIG. 5 is a block diagram of an exemplary SCEF 106. In FIG. 5, SCEF 106 includes at least one processor 110 and a software update manager 112. Software update manager 112 may perform functionality that is slightly different from software update manager 112 of AS 108. That is, software update manager 112 may receive software and hardware information from the MME device and deliver it to AS 108. Software update manager 112 may also receive software encapsulated in an NIDD message from AS 112 and deliver it to MME 104. Software update manager 112 may also store MTC device hardware and software update information in a hardware/software information repository 130. SCEF 106 may also include CDC service module 132 that performs connectivity and other functions for MTC devices, as described above.

Figure 6:
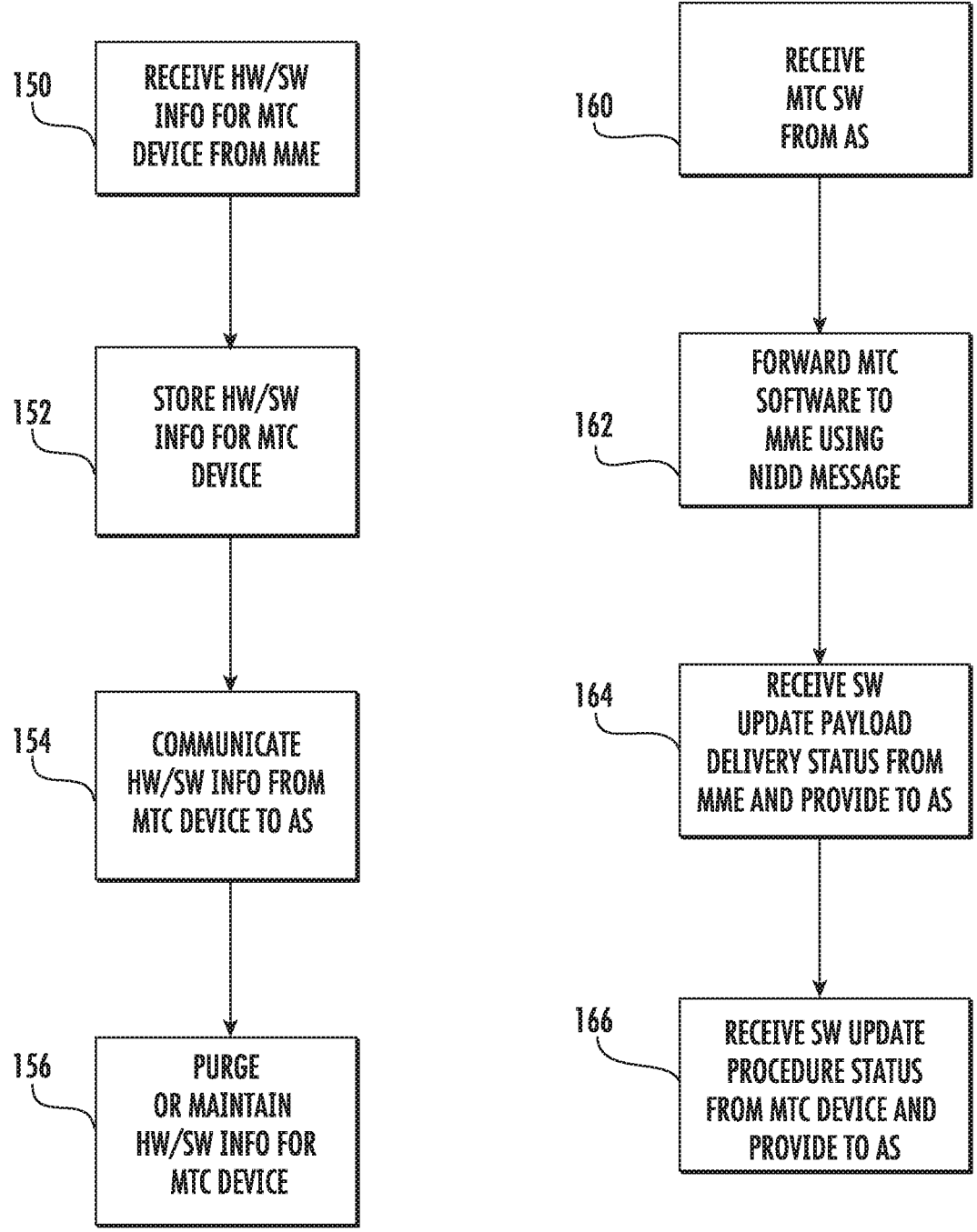
FIGS. 6A and 6B are flow charts illustrating exemplary steps performed by an SCEF in performing MTC device software updating using NIDD messaging.

FIGS. 6A and 6B illustrate exemplary steps performed by an SCEF 106 in performing a software update for an MTC device. In particular, FIG. 6A illustrates steps performed by the MTC device in response to receiving hardware and software version information from an MTC device, and FIG. 6B illustrates steps performed by SCEF 106 in delivering a software update to an MTC device. Referring to FIG. 6A, in step 150, SCEF 106 receives hardware and software version information for an MTC device from MME 104. The information may be transmitted to SCEF 106 in an NIDD message. In one example, the NIDD message is a CM request message transmitted from MME 104 to SCEF 106 over the T6a interface. In step 152, SCEF 106 stores the hardware and software information for the MTC device. In one example, the hardware and software version information may be stored in memory of SCEF 106. In step 154, SCEF 106 communicates the hardware and software version information for the MTC device to AS 108. The communication of the hardware and software version information to AS 108 may occur via an NIDD message. In one example, the NIDD message is a MO data request message transmitted from SCEF 106 to AS 108 over the T8 interface. In step 156, SCEF 106 may either purge or maintain the hardware and software version information for the MTC device after communicating the information to AS 108.

Referring to FIG. 6B, steps performed by SCEF 106 for delivering the software update to MTC device 100 are illustrated. Referring to FIG. 6B, in step 160, SCEF 106 receives the updated MTC device software from AS 108. AS 108 may communicate the updated MTC device software to SCEF 106 in an NIDD submit request message. In step 162, SCEF 106 forwards the updated MTC device software to MME 104 using an NIDD message. In one example, the software may be included in a non-IP data information element in a TDR message. In step 164, SCEF 106 receives a software update payload delivery status from MME 104 and provides the status to AS 108. For example, in FIG. 3, the MT data transfer answer and NIDD submit response confirm delivery of the data to MTC device 100. In step 166, SCEF 106 receives software update procedure status information from the MTC device and provides the information to AS 108. For example, in lines 9-11 of FIG. 3, MTC device 100 communicates the software update status information to AS 108 via MME 104 and SCEF 106 using NAS and NIDD messaging.

Figure 7:
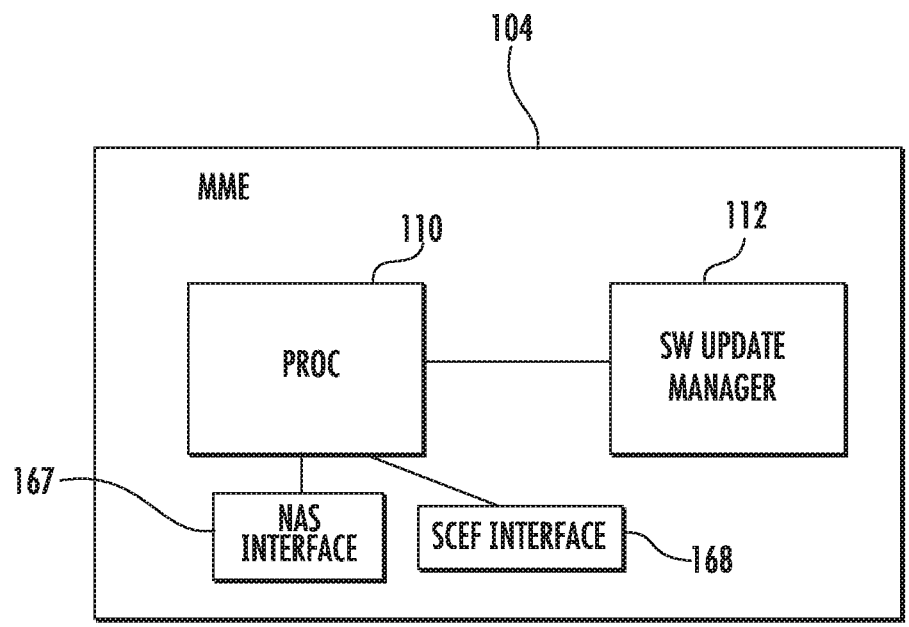
FIG. 7 is a block diagram illustrating a mobility management entity (MME) for performing steps associated with MTC device software updating using NIDD messaging.
Figure 8A:
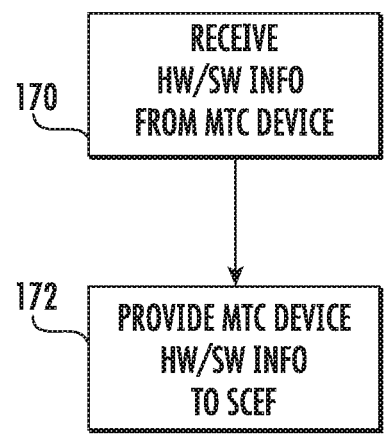
FIGS. 8A and 8B are flow charts illustrating exemplary steps performed by an MME in implementing MTC device software updating using NIDD and NAS messaging.
Figure 8B:
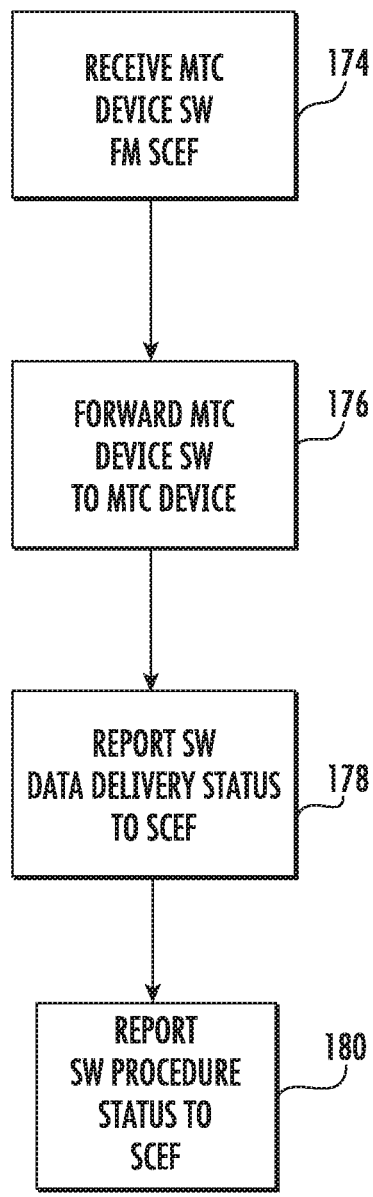

FIG. 7 is a block diagram of MME 104 including components relevant to updating software of MTC device 100. Referring to FIG. 7, MME 104 includes a processor 110 and a software update manager 112 as described above. Software update manager 112 may perform MME specific functions associated with updating MTC device software. Such functions are illustrated in FIGS. 8A and 8B. MME 104 also includes a NAS interface 167 and a SCEF interface 168. NAS interface 167 enables MME 104 to communicate with MTC device 100 via eNB 102 using NAS signaling. NAS signaling is transparent to eNB 102. SCEF interface 168 enables MME 104 to communicate with SCEF 106 using NIDD messaging over T6a interface. As stated above, this NIDD messaging may be used to determine the need for and deliver software updates to MTC device 100.

Referring to FIG. 8A, in step 170, MME 104 receives hardware and software version information from an MTC device. The hardware and software version information may be communicated to MME 104 in a NAS attach request message using the protocol configuration options information element. In step 172, MME 104 forwards the MTC hardware and software version information to SCEF 106. As illustrated in FIG. 3, the information may be communicated to SCEF 106 in an NIDD connection management request message sent on the T6a interface.

FIG. 8B illustrates exemplary steps performed by MME 104 in providing software to an MTC device. Referring to FIG. 8B, in step 174, MME 104 receives MTC device software from SCEF 106. The software may be received in a non-IP data information element in an MT data transfer request message from the SCEF. In step 176, MME 104 forwards the MTC device software to the MTC device. The software may be sent in a user data information element (IE) within an ESM data transport message. In step 178, MME 104 reports the software data delivery status to the SCEF. The data delivery status may be sent through an MT data transfer answer message to the SCEF for the successful receipt of the data transfer request message containing software in the non-IP data IE. In step 180, the MTC device completes the software update and reports the software update to MME 104. MME 104 reports the software update procedure status to SCEF 106. The information may be carried in a mobile originated data transfer request message in a non-IP data IE.

Figure 9:
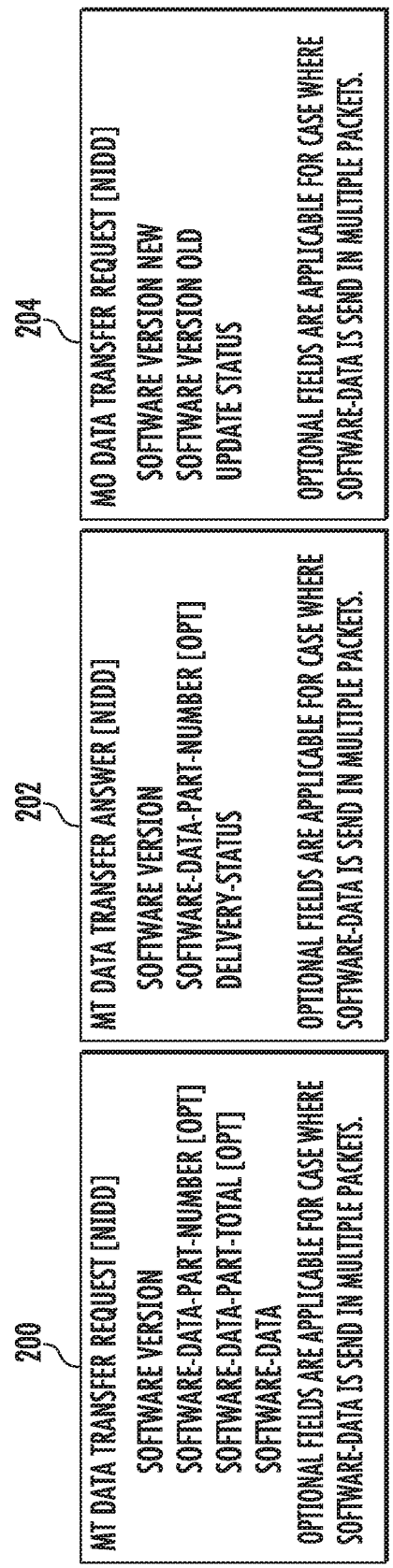
FIG. 9 is a block diagram illustrating components of NIDD messages used for MTC device software updating.

FIG. 9 illustrates exemplary message formats in fields that may be used to deliver software updates to and from an MTC device. Referring to FIG. 9, The MT data transfer request message 200 is an NIDD message that can be used to carry indications of the current software version to be delivered to the MTC device, the number of the current data part of the software being delivered, the total number of software data parts to be delivered, and the software data.

The software data part number and the total number of software data parts may be used in cases where software is delivered in multiple messages to MTC device 100.

The MT data transfer answer message 202 is an NIDD message that can be used to carry status information regarding the software update from MTC device 100 to the network. In the illustrated example, MT data transfer answer message 202 includes an indication of the current software version, the software data part number, and the delivery status. The software data part number field may be used in cases where software is delivered in multiple parts to MTC device 100.

The MO data transfer request message 204 is an NIDD message transmitted from MME 104 to SCEF 106 that indicates the status of the software update operation. The MO data transfer request message includes an indication of the current software version, the previous software version, and the update status. Other optional fields that may be included can indicate the number of software data parts successfully delivered or installed.

Thus, using the subject matter described herein, non-IP data messaging can be used to deliver software updates to MTC devices. Advantages of this approach include the ability for the MTC device to function without an IP stack which enables software updates to be performed more efficiently and with less battery usage. IP addresses may also be conserved. The software update procedures described herein may be performed automatically, avoiding manual efforts and may benefit from other control plane optimizations.

In the examples illustrated in FIGS. 2-8B, the software update managers 112 on the MME 104, the SCEF 106, and AS 108 cooperate to perform software updates for an MTC device. In an alternate implementation, the functionality of the software update manager may be completely located on any of MME 104, SCEF 106, and AS 108, or any combination of these network elements. In addition, a control network plane network node that implements MTC device software updating functionality may implement SCEF, AS, and Diameter routing agent functionality. Such a node would implement the SCEF and AS functionalities associated with MTC device software updating, as described herein. In addition, the node would implement DRA functionality, which includes routing received Diameter signaling messages based on the content of Diameter routing attribute value pairs (AVPs) in the Diameter messages.

In yet another alternate implementation, the control plane network node that implements MTC device software update functionality can be a network gatekeeper. Such a gatekeeper may be deployed on the same node or on a separate node from SCEF 106. The network gatekeeper may include a processor, a memory, and a software update manager that performs the functions of any one or more of software update managers 112 described above. The network gateway may also provide API services for internal and external developers to access services provided in a service provider's network using a standard interface, such as a web services interface.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for machine type communications (MTC) device software updating, the method comprising:

receiving, by a control plane network node including at least one processor and via non-IP data delivery (NIDD) or non-access stratum (NAS) messaging, hardware and software version information regarding an MTC device;

determining, by the control plane network node and based on the hardware and software version information, that a software update is available for an MTC device;

in response to determining that a software update is available for the MTC device, transmitting, by the control plane network node and via NIDD or NAS messaging, the software update for delivery to the MTC device, wherein transmitting the software update includes transmitting software update to a third generation partnership project (3GPP) service capability exposure function (SCEF) in an NIDD submit request message;

transmitting the software update from the SCEF to a mobility management entity (MME) in a mobile terminated data transfer request message; and receiving, at the control plane network node and via NIDD or NAS messaging, status information regarding delivery of the software update to the MTC device or installation of the software update by the MTC device.

2. The method of claim 1 wherein the control plane network node includes at least one of a network gatekeeper and an application server (AS).

3. The method of claim 1, wherein receiving the hardware and software version information includes receiving the hardware and software version information at an application server (AS) and wherein determining whether a software update is available for the MTC device includes performing a lookup in a software repository.

4. The method of claim 3 wherein receiving the hardware and software version information at the AS includes receiving the hardware and software version information from the SCEF via an NIDD submit request message.

5. The method of claim 1 wherein transmitting the software update includes, transmitting the software update from an application server (AS) to the SCEF.

6. The method of claim 1 comprising transmitting the software update from the MME to the MTC device in a non-access stratum (NAS) message.

7. The method of claim 6 wherein the NAS message comprises a NAS data transport message.

8. The method of claim 1 wherein receiving status information regarding the software update comprises receiving, via NIDD messaging, an indication of delivery of the software update to the MTC device and installation of the software update by the MTC device.

9. A system for machine type communications (MTC) device software updating, the system comprising:

a control plane network node including at least one processor configured for receiving, via non-IP data delivery (NIDD) or non-access stratum (NAS) messaging, hardware and software version information regarding an MTC device;

a software update manager associated with the control plane network node configured for determining, based on the hardware and software version information that a software update is available for an MTC device, in response to determining that a software update is available for the MTC device, transmitting the software update for delivery to the MTC device using NIDD or NAS messaging, and receiving, at the control plane network node and via NIDD or NAS messaging, status information regarding delivery of the software update to the MTC device or installation of the software update by the MTC device; and a third generation partnership project (3GPP) service capability exposure function (SCEF), wherein transmitting the software update includes transmitting software update to the SCEF in an NIDD submit request message and wherein the SCEF is configured for transmitting the software update to a mobility management entity (MME) in a mobile terminated data transfer request message.

10. The system of claim 9 wherein the control plane network node includes at least one of a network gatekeeper and an application server (AS).

11. The system of claim 9, wherein the control plane network node comprises an application server (AS) configured to perform a lookup in a software repository to determine whether the software update is available for the MTC device.

12. The system of claim 11 wherein the AS receives the hardware and software version information from the SCEF via an NIDD submit request message.

13. The system of claim 9 wherein the control plane network node comprises an application server (AS) that transmits the software update to the SCEF in an NIDD submit request message.

14. The system of claim 9 wherein the MME is configured to transmit the software update from the MME to the MTC device in a non-access stratum (NAS) message.

15. The system of claim 14 wherein the NAS message comprises a NAS data transport message.

16. The system of claim 9 wherein control plane network node is configured to receive, via NIDD messaging, an indication of delivery of the software update to the MTC device and installation of the software update by the MTC device.

17. The system of claim 9 wherein the control plane network node is configured to deliver the software update to the MTC device in multiple parts.

18. A non-transitory computer readable medium having stored thereon executable instructions that when executed by a processor of a computer control the computer to perform steps comprising:

receiving, by a control plane network node including at least one processor and via non-IP data delivery (NIDD) or non-access stratum (NAS) messaging, hardware and software version information regarding a machine type communications (MTC) device;

determining, by a control plane network node and based on the hardware and software version information, that a software update is available an MTC device;

in response to that a software update is available for the MTC device, transmitting, by the control plane network node and via NIDD or NAS messaging, the software update for delivery to the MTC device, wherein transmitting the software update includes transmitting software update to a third generation partnership project (3GPP) service capability exposure function (SCEF) in an NIDD submit request message;

transmitting the software update from the SCEF to a mobility management entity (MME) in a mobile terminated data transfer request message; and receiving, at the control plane network node and via NIDD or NAS messaging, status information regarding delivery of the software update to the MTC device or installation of the software update by the MTC device.

* * * * *